United States Patent [19]

Sakaguchi et al.

[11] Patent Number: 4,943,332
[45] Date of Patent: Jul. 24, 1990

[54] METHOD FOR PRODUCTION OF LIQUID CENTER BALL FOR GOLF BALL

[75] Inventors: Akihiro Sakaguchi, Kanagawa; Noriyuki Kaneko; Toshio Saruta, both of Tokyo; Ryotaro Sawano, Kanagawa, all of Japan

[73] Assignee: Bridgestone Corporation, Tokyo, Japan

[21] Appl. No.: 297,225

[22] Filed: Jan. 13, 1989

[30] Foreign Application Priority Data

Mar. 7, 1988 [JP]  Japan ................... 63-53125

[51] Int. Cl.$^5$ .................... A63B 37/08; B29C 65/00
[52] U.S. Cl. .................... 156/146; 273/231; 156/245; 156/338
[58] Field of Search ............. 156/145, 146, 338, 245; 273/227, 230, 231

[56] References Cited

U.S. PATENT DOCUMENTS

| | | | |
|---|---|---|---|
| 1,192,831 | 7/1916 | Knight | 273/227 |
| 2,322,140 | 6/1943 | Kalowski | 156/145 |

FOREIGN PATENT DOCUMENTS

| | | | |
|---|---|---|---|
| 0137687 | 5/1948 | Australia | 273/231 |
| 0715073 | 9/1954 | United Kingdom | 156/245 |
| 1209316 | 10/1970 | United Kingdom | 273/230 |
| 2032286 | 3/1980 | United Kingdom | 273/231 |

Primary Examiner—Michael W. Ball
Assistant Examiner—Steven D. Maki
Attorney, Agent, or Firm—Kanesaka and Takeuchi

[57] ABSTRACT

Disclosed is a method of producing a liquid ball for golf ball, which is characterized in that an adhesive is coated on the edge surfaces of a pair of bag rubber hemispheres and then the said pair of hemispheres are combined in a liquid material and thereafter vulcanized.

11 Claims, 2 Drawing Sheets

METHOD FOR PRODUCTION OF LIQUID CENTER BALL FOR GOLF BALL

FIELD OF THE INVENTION AND RELATED ART STATEMENT

The present invention relates to a method for production of a liquid center ball for a golf ball and, in particular, to a method of efficiently producing a liquid center ball for a golf ball of high quality with extremely small dispersion in the product quality of balls produced.

The core material of yarn-wound golf balls includes two kinds, i.e. a liquid center where a liquid or paste has been enveloped in a rubber bag and a solid center.

Among them, the solid center is relatively inexpensive as the production thereof is easy and the production method has been improved and advanced, and therefore it is used as a core material for golf balls for middle grade to high grade golfers.

On the other hand, the liquid center is preferred by the highest grade golfers such as progolfers or top amateur golfers, because of the good feeling and easy control in making a shot. However, production of the liquid center is difficult, although the liquid center is excellent in the characteristic and capacity, and therefore this has heretofore been used only in yarn-wound balls of the highest quality.

Hitherto, the following methods have been known for production of a liquid center for a golf ball.

(1) A liquid or paste core material is put in a spherical mould and frozen at a low temperature to give a solid core material, a non-vulcanized bag rubber is coated over the said solid core material, and the thus coated material is put in a mould and shaped and vulcanized therein (freezing method).

(2) Two bag rubber hemispheres are vulcanized and shaped, and these are combined with an adhesive and again vulcanized and shaped to give a hollow bag. Next, a determined amount of a liquid is injected into the bag with an injector or the like, and thereafter the hole made by the injection is sealed (injection method with injector).

However, both of the above-mentioned conentional methods are composed of several reaction steps and the operation thereof is complicated, and therefore the manufacture cost is high and the dispersion in the weight of the products is remarkable as air would remain in the inside of the bag. Accordingly, weight selection is required for the respective products produced by the conventional methods. Even after such weight selection, there would often be troublesome dispersion in the flying capacity of the respective balls having the thus selected liquid center because of the existence of the air in the inside of the bag.

OBJECT AND SUMMARY OF THE INVENTION

One object of the present invention is to overcome the above-mentioned problems in the conventional methods and to provide a method for production of a liquid center ball in which the constitutional steps may noticeably be reduced.

Another object of the present invention is to provide a method of producing a liquid center ball in which air may be prevented from remaining in the inside of the ball formed so that weight dispersion of the products may be suppressed.

Still another object of the present invention is to provide a method of producing a liquid center ball which is inexpensive but has a high quality and which is excellent in the quality stability, with high production efficiency.

In accordance with the present invention, there is provided a method of producing a liquid center ball, which is characterized in that an adhesive is coated on the edge surfaces of a pair or bag rubber hemispheres and the said pair of hemispheres are combined in a liquid material and then vulcanized.

DESCRIPTION OF THE PREFERRED EMBODIMENTS

The present invention will be explained in detail hereunder with reference to the drawings attached hereto.

Figure 1A:
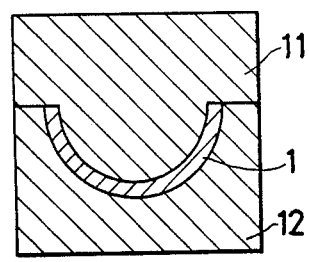
FIG. 1 (a) to FIG. 1 (e) are sectional views to show one example of manufacturing steps of a liquid center ball, in accordance with the present invention.
Figure 1B:
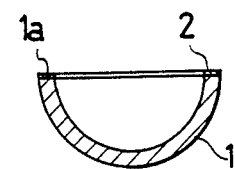
Figure 1C:
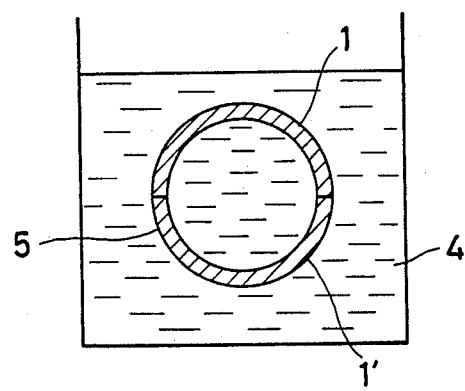
Figure 1D:
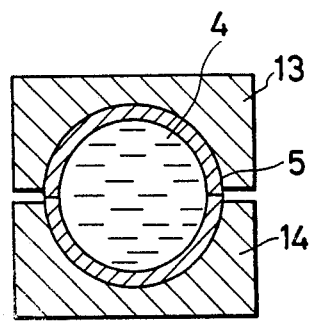
Figure 1E:
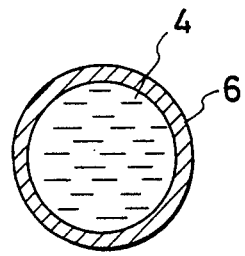

FIG. 1 (a) to FIG. 1 (e) are sectional views to explain manufacturing steps of a liquid center ball for a golf ball, in accordance with the present invention.

In accordance with the method of the present invention, a hemisphere (1) of a pair of bag rubber hemispheres is vulcanized and shaped with molds (110 and (12) (FIG. 1 (a)). In this step, if the vulcanizing time is too long, the adhesibility in the final step of vulcanization and shaping would become poor; and if the vulcanizing temperature is too high, the same phenomenon would occur. Accordingly, in the vulcanization and shaping step of the hemispheres, the condition is desired to be so determined that the adhesibility in the final vulcanization and shaping step is not worsened under consideration of the bag rubber material and the size of the hemisphere. In the vulcanization and shaping step, use of a mould releasing agent is not preferred.

Next, an adhesive (2) is uniformly coated on the edge surface (1a) of the hemisphere (1) (FIG. 1 (b)), and after some open time, a pair of hemispheres (1) and (1') is dipped in a liquid material (4) of a liquid center. Then, after fully degassed, the two hemispheres are combined with the inside thereof being filled with the liquid material (4) (FIG. 1 (c)), whereby conjunction of the hemispheres (1) and (1') and liquid-filling in the thus completed sphere are effected at the same time.

Next, the sphere (5) composed of the hemispheres (1) and (1') as combined with an adhesive and filled with a liquid in the inside thereof is taken out from the liquid material (4) and then vulcanized and shaped in moulds (13) and (14) (FIG. 1 (d)), whereby the combined surfaces are stuck and sealed to give a liquid center ball (6) (FIG. 1 (e)).

In accordance with the said method, however, the liquid material to be employed would naturally be limited and a liquid material having a high specific gravity is difficult to be employed for the purpose. Accordingly, there would be a probability that the specific gravity of the liquid center ball to be produced by the said method would be somewhat limited. Specifically, in the said method, a pair of bag rubber hemispheres, edge surfaces of which have been coated with an adhesive, are dipped in a liquid material and are combined therein. Accordingly, a liquid having a high concentration and high specific gravity, which would adhere to the adhesive-coated edge surfaces to thereby lower the adhesive power or the adhesive coated on the said edge surfaces is unsuitable to be used as the liquid material for dipping the said hemispheres. Therefore, a liquid having a relatively low specific gravity, such as water or ethylene glycol, is generally used as the liquid material for said method. Under the situation, the specific gravity of the liquid center ball obtainable by the said method would thereby be naturally limited and the adjustment of the specific gravity of the respective balls obtained would not be so easy.

In order to overcome such trouble, it is preferred, in accordance with another embodiment of the present invention, to previously incorporate a substance which is suspendable in the liquid material into at least one of the said hemispheres.

Figure 2A:
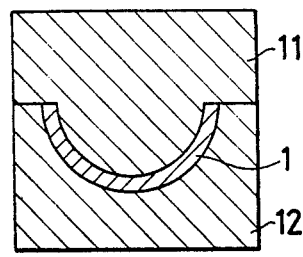
FIG. 2 (a) to FIG. 2 (e) are sectional views to show another example of manufacturing steps of a liquid center ball, in accordance with the present invention.
Figure 2B:
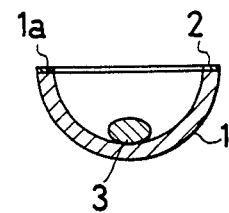
Figure 2C:
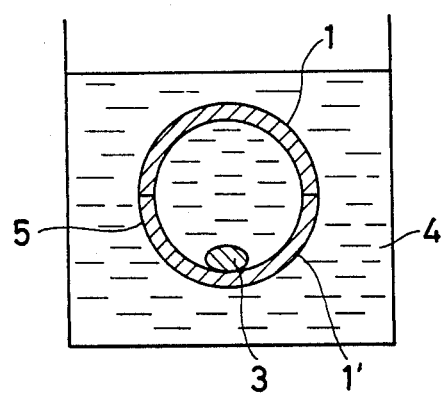
Figure 2D:
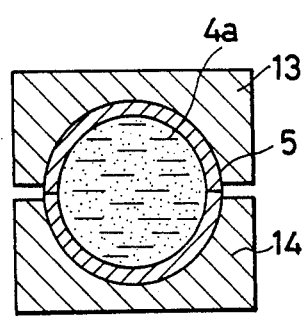
Figure 2E:
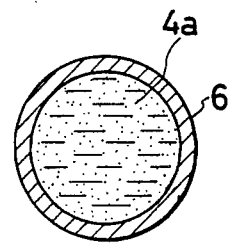

Next, the second method of the present invention of producing a liquid center ball by the use of a substance which is suspendable in the liquid material to be the center liquid of the ball will be explained hereunder, with reference to FIG. 2 (a) to FIG. 2 (e).

Also in the method, a hemisphere (1) of a pair of bag rubber hemispheres is first vulcanized and shaped in moulds (11) and (12) (FIG. 2 (a)), like the case of the aforesaid step of FIG. 1 (a).

Next, a substance (3) which is suspendable in the liquid material ((4) in FIG. 2 (c)) to be in the inside of the hemisphere (1) is inserted into the inside of the hemisphere (1) while an adhesive (2) is uniformly coated on the edge surface (1a) of the hemisphere (FIG. 2 (b)), and after some open time, a pair of hemispheres (1) and (1') are dipped in a liquid material (4) of a liquid center. Then, after fully degassed, the two hemispheres are combined with the inside thereof being filled with the liquid material (4) (FIG. 2 (c)), whereby conjunction of the hemispheres (1) and (1') and liquid-filling in the thus completed sphere are effected at the same time.

Next, the sphere (5) composed of the hemispheres (1) and (1') as combined with an adhesive and filled with a liquid in the inside thereof is taken out from the liquid material (4) and then vulcanized and shaped in moulds (13) and (14) (FIG. 2 (d)), whereby the combined surfaces are stuck and sealed and the substance (3) which is suspendable in the liquid material is uniformly dispersed and suspended in the liquid material (4) because of the thermal kinetic energy generated by heating in the vulcanization. Thus a liquid center ball (6) where the suspension (4b) of the said substance (3) as dispersed in the liquid material (4) has been enveloped in the inside of the ball (5) is obtained (FIG. 2(e)).

In the present invention, any conventional bag rubber for liquid center ball for a golf ball can be employed as the bug rubber material, which includes, for example, natural rubber, butadiene rubber, isoprene rubber or a mixed rubber thereof. In vulcanization and shaping of the bag rubber, stearic acid, zinc flower, oil, sulfur or a vulcanizing agent are added to the said rubber material.

As the liquid material for the liquid center which is enveloped in the bag rubber, water or an aqueous ethylene glycol solution is generally used.

The substance which is suspendable in the said liquid material (which may be referred to as a "specific gravity-adjusting substance" hereinafter) is not specifically limited but it is preferable to have plasticity and may be provided in the form of a solid from the view point of the easy handlability thereof. Specifically, a solid formed by incorporating the above-mentioned liquid material and a tackifier or surfactant or the like to various kinds of inorganic compounds, such as $BaSO_4$, $CaSO_4$ or $Na_2SO_4$, or clay minerals, metal powders or heavy ore powders is favorably used as the said substance.

As the said specific gravity-adjusting substance is used for adjustment of the specific gravity of the liquid center ball, the amount thereof to be incorporated is properly determined in accordance with the intended specific gravity of the liquid center ball to be produced.

In the present invention, as the adhesive to be used for conjunction of the bag rubber hemispheres, one capable of displaying a sufficient adhesive strength in adhesion with the bag rubber material in low temperature vulcanization at a temperature of from 80° C. to 120° C. or so, especially 100° C. or so, is desirably used. If the bag rubber sphere is vulcanized at a general vulcanization temperature of 150° C. or so, the inner pressure of the liquid center ball would become too high so that the ball would be broken. Accordingly, in the method of the present invention, the vulcanization is conducted by low temperature vulcanization at a temperature of 100° C. or so. Therefore, it is important to use such an adhesive to be able to attain a sufficient adhesive strength under the temperature of such degree.

As the adhesive for the method of the present invention, a rubber paste or the like formed by dissolving or suspending a rubber component in an organic solvent such as toluene is generally used. In particular, in accordance with the present invention, a rubber paste formed by incorporating 3 parts by weight or more, preferably from 3 to 7 parts by weight or so, of a vulcanization promoter and from 2 to 8 parts by weight or so of a tackifier to 100 parts by weight of a rubber component is suitably used in order to obtain a sufficient strength in the said low temperature vulcanization. The vulcanization promoter which may be used for the purpose in the present invention includes, for example, diphenylguanidine (referred to as "D"), tetramethylthiuram disulfide (referred to as "TT"), zinc dibutyldithiocarbamate (referred to as "BZ") and N-cyclohexyl-2-benzothiazylsulphenamide (referred to as "CM"); and the tackifier for use in the present invention includes, for example, chromain resins, indene resins, phenol-formaldehyde resins, xylene-formaldehyde resins, polyterpene resisns, petroleum hydrocarbon resins and rosin esters.

The "hemisphere of bag rubber" as herein referred to is not always required to have a shape resulting from division of a sphere at its center into just halves but may be anyone capable of forming a hollow sphere by combination of a pair of the hemispheres. For instance, a combination of a ¼ sphere and a ¾ sphere may be used in the method of the present invention.

In the step of combining a pair or bag rubber hemispheres in the liquid material in the method of the present invention, a proper holder or the like may be provided in the liquid material so that plural pairs of hemispheres may be combined at the same time, whereby the production efficiency may be elevated.

As a pair of rubber bag hemispheres are combined in a liquid material in the method of the present invention, no air remains in the inside of the resulting liquid center ball so that the liquid center ball may be completely filled with the liquid material. Accordingly, the dispersion of the weight of the products produced by the method is small and weight selection may be omitted, if desired.

Further, in accordance with the method of the present invention, liquid-filling and combination of hemispheres are conducted at the same time, and adhesion of the combined hemispheres and sealing thereof are conducted also at the same time. Accordingly, the number of the operating steps is small and the production efficiency is improved, so that the manufacture cost may noticeably be reduced.

In accordance with the method of the present invention, therefore, liquid center balls which have a high product quality and which are excellent in the quality stability may be produced with high production efficiency, so that it may be said possible to lower the price of the commerical products.

In particular, when a specific gravity-adjusting substance is used in the method of the present invention, adjustment of the specific gravity of the respective ball products may thereby be effected. Accordingly, liquid center balls having a desired specific gravity can be produced with ease, merely by varying the amount of the specific gravity-adjusting substance to be incorporated, without using any high specific gravity liquid material.

Now the present invention will be explained in more detail hereunder with reference to examples and comparative examples. Unless departing from the spirit of the present invention, the present invention is not whatsoever limited to only the following examples.

Example 1

(Production of Liquid Center Ball)

A liquid center ball was prepared by the method of the present invention as illustrated in FIG. 1 (a) to FIG. 1 (e).

Specifically, a non-vulcanized rubber comprising the components mentioned below was vulcanized and shaped in a mould composed of a projected mould part (11) with an outer diameter of 24 mm and a depressed mould part (12) with an inner diameter of 28 mm, at 145° C. for 2 minutes to form a hemisphere (1) or (1'), as shown in FIG. 1 (a). A rubber paste (2) comprising the components mentioned below was fully coated on the edge surface of each of the thus prepared hemispheres (1) and (1'), and after some open time, the hemispheres were dipped in an aqueous 4% ethylene glycol solution and combined together. Next, the thus combined sphere was taken out from the liquid and then vulcanized and shaped in the mould composed of the mould parts (13) and (14) with an inner diameter of 28 mm, at 145° C. for 6 minutes, to obtain a liquid center ball (6).

| Composition of Bag Rubber: | |
|---|---|
| Natural Rubber | 100 PHR |
| Stearic Acid | 1 PHR |
| Zinc Flower | 200 PHR |
| Naphthene Oil | 40 PHR |
| Vulcanization Promoter | 1.5 PHR |
| Sulfur | 3 PHR |
| Composition of Rubber Paste: | |
| Rubber Component/Toluene = ½ (by weight) | |
| Rubber Component: | |
| Natural Rubber | 100 PHR |
| Zinc Flower | 20 PHR |
| Vulcanization Promoter | 1.5 PHR |
| Sulfur | 3 PHR |

The weight of the thus prepared liquid center ball was determined and the mean weight was obtained therefrom. The difference between the maximum value and the minimum value was obtained, and the dispersion of the weight of the respective balls was checked. The results are shown in Table 1 below.

(Production of Yarn-wound Golf Ball)

Using the thus prepared liquid center ball, a yarn-wound golf ball was produced as mentioned below.

Specifically, a yarn rubber comprising the components mentioned below was vulcanized at 150° C. for 40 minutes and then wound around the liquid center ball. Next, the thus wound ball was coated with a cover (thickness: 2.0 mm) comprising the components mentioned below and then shaped under pressure at 150° C. for 5 minutes to give a large-sized ionomer cover yarn-wound golf ball having a diameter of 42.7 mm, a mean weight of 45.2 g and a hardness (PGA) of 90.

| Composition of Yarn Rubber: | |
|---|---|
| Cis-1,4-polyisoprene Rubber | 50 parts by weight |
| Natural Rubber | 50 parts by weight |
| Sulfur | 1 parts by weight |
| Zinc Oxide | 0.6 parts by weight |
| Vulcanization Promoter | 1.5 parts by weight |
| Promoter Aid | 1 parts by weight |
| Composition of Cover: | |
| Ionomer REsin | 100 parts by weight |
| (Surlyn ® 1557 (trade name by DuPont, USA) having Shore D Hardness of 63 degrees | |
| Titanium Oxide | 1 parts by weight |

The weight of the thus prepared yarn-wound golf ball was measured, and the difference between the maximum value and the minimum value was calculated and shown in Table 1.

(Test of Capacity of Yarn-wound Golf Ball)

The yarn-wound golf ball was subjected to shooting test, using a shooting robot manufactured by True Temper Co., whereupon the difference between the maximum value and the minimum value of the flying distance at a head speed of 45 m/sec was obtained and the dispersion of the flying capacity was checked. The result is shown in Table 1.

Comparative Example 1

Hemispheres were prepared in the same manner as Example 1, and an adhesive was coated over the edge surfaces of the two hemispheres. These hemispheres were put in a mould having an inner diameter of 28 mm and vulcanized at 145° C. for 6 minutes to prepare a hollow bag. A liquid was injected into the hollow bag with an injector, and the injected hole was sealted with an adhesive. Thus a liquid center ball was produced.

The bag rubber material, the adhesive and the liquid material were same as thos used in Example 1.

The dispersion of the weight of the thus prepared liquid center balls was determined by the same method as in Example 1, and a yarn-would golf ball was prepared from the said liquid center ball in the same manner as in Example 1. Then the dispersion of the weight of the ball as well as the dispersion of the flying capacity thereof were also checked.

The results obtained are shown in Table 1.

Comparative Example 2

A liquid material for a liquid center was put in a spherical mould having an inner diameter of 24 mm and cooled at −30° C. for 1 hour to be frozen. A rubber sheet having a thickness of 2.1 mm was coated over the thus solidified liquid material to give a non-vulcanized liquid center ball. Next, this was thawed at room temperature, put in a mould having an inner diameter of 28 mm and vulcanized and shaped therein at 145° C. for 6 minutes to obtain a liquid center ball.

The bag rubber material and the liquid material for the liquid center were same as those used in Example 1.

The dispersion of the weight of the thus prepared liquid center balls was determined by the same method as in Example 1, and a yarn-would golf ball was prepared from the said liquid center ball also in the same manner as in Example 1. Then the dispersion of the weight of the ball as well as the dispersion of the flying capacity thereof were also checked.

The results obtained are shown in Table 1.

TABLE 1

| Example | Example 1 | Comparative Example 1 | Comparative Example 2 |
|---|---|---|---|
| Liquid Center Ball Mean Weight (g) | 18.0 | 18.1 | 18.1 |
| Weight Dispersion (g) (maximum value-minimum value) | 0.2 | 0.5 | 0.8 |
| Yarn-wound Golf Ball Weight Dispersion (g) (maximum value-minimum value) | 0.1 | 0.2 | 0.4 |
| Yarn-wound Golf Ball Flying Capacity Dispersion (m) (maximum flying distance-minimum flying distance) | 5.5 | 7.8 | 8.9 |

The results in Table 1 above obviously indicate that the liquid center balls prepared by the method of the present invention had an extremely small weight dispersion and were excellent in the product quality stability and therefore yarn-wound golf ball which were excellent in the small weight dispersion and the high flying capacity stability could be obtained therefrom.

Example 2

A liquid center ball was prepared by the method of the present invention as illustrated in FIG. 2 (a) to FIG. 2 (e).

Specifically, a non-vulcanized rubber comprising the components mentioned below was vulcanized and shaped in a mould composed of a projected mould part (11) with an outer diameter of 24 mm and a depressed mould part (12) with an inner diameter of 28 mm, at 145° C. for 2 minutes to form a hemisphere (1) or (1'), as shown in FIG. 2 (a). A rubber paste (2) comprising the components mentioned below was fully coated on the edge surface of each of the thus prepared hemispheres (1) and (1'), and 8.6 g of a specific gravity-adjusting substance (3) comprising the components mentioned below was incorporated into the inside of the hemisphere (1), and after some open time, the two hemispheres were dipped in water (4) and combined together. Next, the thus combined shpere was taken out from the water (4) and then vulcanized and shaped in the mould composed of the mould parts (13) and (14) with an inner diameter of 28 mm, at 100° C. for 15 minutes, to obtain a liquid center ball (6), as shown in FIG. 2 (d).

| Composition of Bag Rubber: | |
|---|---|
| Natural Rubber | 100 parts by weight |
| Stearic Acid | 1 parts by weight |
| Zinc Flower | 200 parts by weight |
| Naphthene Oil | 40 parts by weight |
| Vulcanization Promoter | 1.5 parts by weight |
| Sulfur | 3 parts by weight |

Composition of Rubber Paste:

The rubber component of the following composition was dissolved in toluene and adjusted to have a viscosity of 150 cps (measured by B-type Viscometer).

| Rubber Component: | |
|---|---|
| Natural Rubber | 100 parts by weight |
| Zinc Oxide | 80 parts by weight |
| Vulcanization Promoter D | 1 parts by weight |
| Vulcanization Promoter CM | 1.5 parts by weight |
| Vulcanization Promoter BZ | 2.5 parts by weight |
| Vulcanization Promoter TT | 0.5 parts by weight |
| Sulfur | 3 parts by weight |
| Tackifier (chroman resin, melting point 90° C.) | 5 parts by weight |

| Composition of Specific Gravity-Adjusting Substance: | |
|---|---|
| $BaSO_4$ | 100 parts by weight |
| Water | 20 parts by weight |
| Ethylene Glycol | 1 parts by weight |
| Viscosity-elevating AGent | 2 parts by weight |
| Surfactant (dodecylbenzenesulfonic acid) | 4 parts by weight |

The thus prepared liquid center ball was cut with a knife and the liquid material enveloped was taken out therefrom and checked. As a result, it was confirmed that the liquid material was in the form of a suspension of $BaSO_4$ having a specific gravity of 1.6.

As is obvious from the result, the specific gravity of the liquid center ball may easily be adjusted by the method of the present invention.

What is claimed is:

1. A method of producing a liquid center ball for a golf ball, comprising,
   preparing a pair of bag rubber hemispheres,
   applying an adhesive onto at least one edge surface of the bag rubber hemispheres and providing a substance into at least one of the bag rubber hemispheres, said substance being suspendable in a liquid material and selected from at least one of an inorganic compound, a clay mineral, a metal powder and a heavy ore powder,
   dipping the bag rubber hemispheres with the substance therein into the liquid material,
   connecting the bag rubber hemispheres together in the liquid material to form a sphere so that the liquid material and the substance are filled therein, and
   vulcanizing the sphere so that the bag rubber hemispheres firmly stick together and the substance in the sphere is uniformly dispersed and suspended in the liquid material.

2. A method as claimed in claim 1, further comprising removing gas from insides of the bag rubber hemispheres dipped in the liquid material before combining the bag rubber hemispheres together.

3. A method as claimed in claim 2, further comprising removing the sphere from the liquid material after the hemispheres are connected together.

4. A method as claimed in claim 1, wherein said substance further includes at least one of tackifier and surfactant.

5. A method as claimed in claim 1, wherein the bag rubber material is composed of one or more selected from the group consisting of natural rubber, butadiene rubber and isoprene rubber.

6. A method as claimed in claim 1, wherein the liquid material is water or an aqueous ethylene glycol solution.

7. A method as claimed in claim 1, wherein the inorganic compound is $BaSO_4$, $CaSO_4$ or $Na_2SO_4$.

8. A method as claimed in claim 1, wherein vulcanization is effected by low temperature vulcanization at a temperature of from 80° to 120° C.

9. A method as claimed in claim 8, wherein a rubber paste formed by incorporating 3 parts by weight or more of a vulcanization promoter and from 2 to 8 parts by weight of a tackifier to 100 parts by weight of a rubber component is used as the adhesive.

10. A method as claimed in claim 9, wherein the vulcanization promoter is diphenylguanidine, tetramethylthiuram disulfide, zinc dibutyldithiocarbamate or N-cyclohexyl-2-benzothiazyl-sulfenamide.

11. A method as claimed in claim 9, wherein the tackifier is a chroman resin, an indene resin, a phenol-formaldehyde resin, a xylene-formaldehyde resin, a polyterpene resin, a petroleum hydrocarbon resin or a rosin ester.

* * * * *